United States Patent [19]
Matsui

[11] 4,303,314
[45] Dec. 1, 1981

[54] COMPACT TELEPHOTO LENS
[75] Inventor: Sei Matsui, Chiba, Japan
[73] Assignee: Nippon Kogaku K.K., Tokyo, Japan
[21] Appl. No.: 126,350
[22] Filed: Mar. 3, 1980
[30] Foreign Application Priority Data
  Mar. 20, 1979 [JP] Japan ................... 54-31788
[51] Int. Cl.³ ............................................. G02B 9/34
[52] U.S. Cl. .................................................. 350/456
[58] Field of Search ............................. 350/223, 456
[56] References Cited
  U.S. PATENT DOCUMENTS
  3,018,688  1/1962  Hayes ..................... 350/223
  3,649,104  3/1972  Edwards et al. ......... 350/223
  4,057,330  11/1977 Matui ...................... 350/223
  4,063,802  12/1977 Imai et al. ................ 350/223

FOREIGN PATENT DOCUMENTS
  1268404  5/1968  Fed. Rep. of Germany ...... 350/223

*Primary Examiner*—John K. Corbin
*Assistant Examiner*—Scott J. Sugarman
*Attorney, Agent, or Firm*—Fitzpatrick, Cella, Harper & Scinto

[57] ABSTRACT

A compact telephoto lens comprises, in succession from the object side, a first lens which is a single positive lens having its surface of sharper curvature facing the object side, a second lens which is a positive meniscus lens having its convex surface facing the object side, a third lens which is a single negative lens having its surface of sharper curvature facing the image side, a stop, and a fourth lens which is a single positive lens having its surface of sharper curvature facing the object side. The telephoto lens satisfies specific conditions.

4 Claims, 10 Drawing Figures

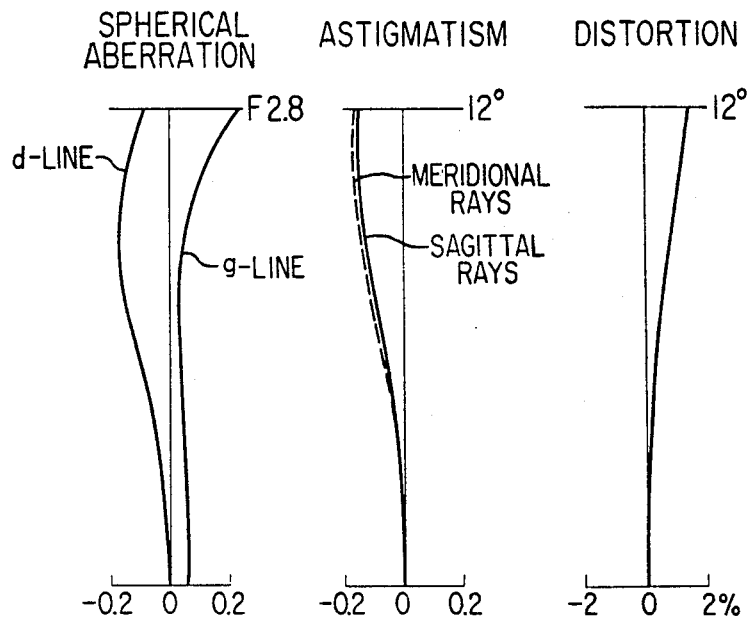
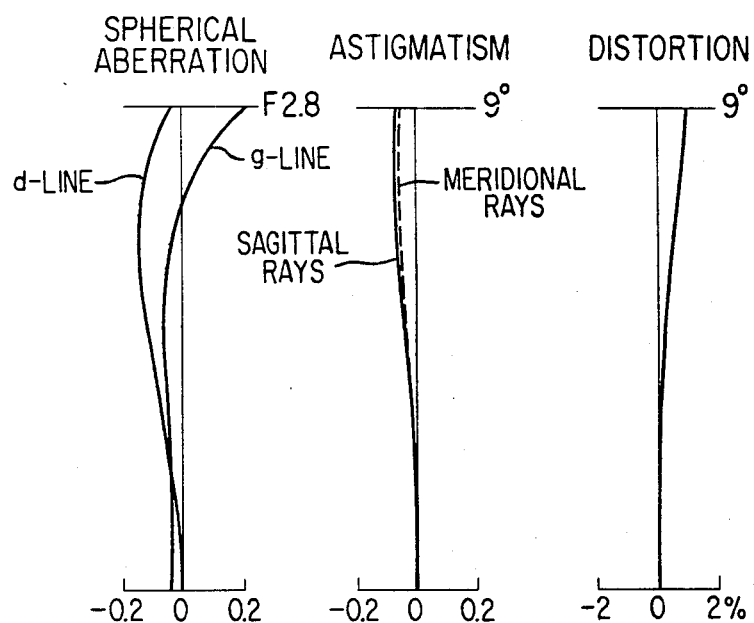

COMPACT TELEPHOTO LENS

BACKGROUND OF THE INVENTION

1. Field of the Invention

This invention relates to a compact, great aperture ratio telephoto lens having an angle of view 18°–24°, an aperture ratio 1:2.8 and a telephoto ratio 0.92–0.94.

2. Description of the Prior Art

In a lens of this class, when the compactness of the lens has been contemplated, the spherical aberration particularly on the short wavelength side (for example, near g-line) has been remarkably over-corrected to cause deterioration of the performance of the lens during the open condition thereof, so that the lens has not been fit for practical use. To avoid this, it has been necessary to provide a joined surface on a concave lens which is a third lens, as disclosed in Japanese Patent Publication No. 36777/1978, for example.

SUMMARY OF THE INVENTION

It is the object of the present invention to provide a compact telephoto lens which comprises four lens components and yet has the same brightness as that of the lens of the prior art and which is excellent in optical performance.

The invention will become fully apparent from the following detailed description thereof taken in conjunction with the accompanying drawings.

BRIEF DESCRIPTION OF THE DRAWINGS

FIGS. 2 to 4 show the aberrations in Embodiments 1, 2 and 3, respectively.

DESCRIPTION OF THE PREFERRED EMBODIMENTS

Figure 1:
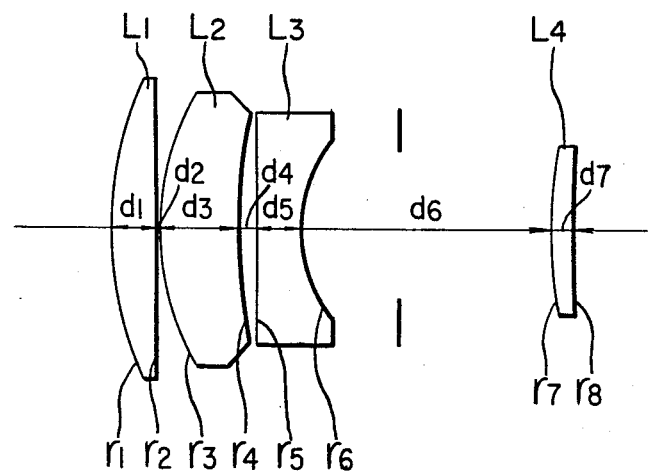
FIG. 1 is a cross-sectional view showing the lens construction of the present invention.

The telephoto lens according to the present invention, as shown in FIG. 1, is of a four-group four-component construction which comprises, in succession from the object side, a first lens $L_1$ which is a single positive lens having its surface of sharper curvature facing the object side, a second lens $L_2$ which is a single positive meniscus lens having its convex surface facing the object side, a third lens $L_3$ which is a single negative lens having its surface of sharper curvature facing the image side, a stop S, and a fourth lens $L_4$ which is a single positive lens having its surface of sharper curvature facing the object side, and it satisfies the following conditions:

(I) $\begin{cases} 0.35 < f_{12} < 0.4f \\ 0.2f < d_1 + d_2 + d_3 + d_4 + d_5 < 0.25f \\ 0.19f < r_6 < 0.21f \end{cases}$ (II) $\begin{cases} 1.35f < f_{123} < 1.46f \\ 0.27f < d_6 < 0.32f \end{cases}$ (III) $\begin{cases} n_1, n_2 > 1.6, n_3, n_4 > 1.7 \\ \nu_1, \nu_2 > 50, \nu_3, \nu_4 < 30 \end{cases}$ where $r_1$–$r_8$ represent the radii of curvature, $d_1$–$d_7$ represent the center thicknesses and air spaces of the respective lenses, $n_1$–$n_4$ represent the refractive indices, $\nu_1$–$\nu_4$ represent the Abbe numbers, $f_1$–$f_4$ represent the focal lengths of the respective lenses, f represents the total focal length of the entire system, $f_{123}$ represents the total focal length of the first to third lenses, and $f_{12}$ represents the total focal length of the first and second lenses.

Condition (I) is for minimizing the overcorrection of the spherical aberration on the short wavelength side (near g-line) without harming the compactness. This over-correction is created by the negative lens which is the third lens, and a decisive amount of aberration is already created when light emerges from the image side surface $r_6$ of the third lens, and the incidence height becomes low in the fourth lens, thus making the correction difficult. To reduce the occurrence of the chromatic aberration of such spherical aberration, particularly, in the short wavelength light, the following measures are conceivable:

(1) Reducing the total focal length $f_{12}$ of the first and second lenses as much as possible, namely, making the composite refractive power of the first and second lenses stronger, thereby causing light to be incident on the low position of the image side surface $r_6$ of the third lens;

(2) Increasing as much as possible $d_1+d_2+d_3+d_4+d_5$, namely, the distance from the surface $r_1$ which is most adjacent to the object side to the image side surface $r_6$ of the third lens, thereby causing light to be incident on the low position of the image side surface $r_6$ of the third lens as in the case of (1); and (3) Increasing the curvature radius of the image side surface $r_6$ of the third lens as much as possible, thereby reducing the diverging action on this surface.

However, if the tendencies of (1), (2) and (3) above are too much intensified, the spherical aberration itself of the standard light rays will become extremely under-corrected and it will become impossible to correct this. Also, the measures (1), (2) and (3) above are means very effective for making the lens system compact, but if these go to excess, good correction of not only spherical aberration but also astigmatism and coma will become difficult as already noted. Thus, condition (1) is the condition which first becomes necessary to well correct the spherical aberration on the short wavelength side as well as the other various aberrations while providing the brightness of an aperture ratio 1:2.8 and the compactness of a telephoto ratio 0.92–0.94.

Condition (II) is for well balancing distortion in relation to the other aberrations. That is, as the total focal length $f_{123}$ of the first, second and third lenses is smaller, more of positive distortion is created and in order to cause this to go in the negative direction, it is necessary to increase the air space between the third lens and the forth lens. Accordingly, in order to well correct the distortion while reducing the aberration variation by distance, it is preferable to balance $f_{123}$ and $d_6$ within said range. Condition (II), with condition (I), is a preferred condition for astigmatism and coma as well.

Condition (III) is a preferred condition for selecting the glass for well correcting chromatic aberration and other various aberrations when conditions (I) and (II) are satisfied.

Now, the numerical data of three preferred embodiments of the telephoto lens according to the present invention will be shown below. In the lists below, $r_1$–$r_8$ represent the curvature radii of the respective lens surfaces, $d_1$–$d_7$ represent the center thicknesses and air spaces of the respective lenses, and $n_1$–$n_4$ and $\nu_1$–$\nu_4$ represent the refractive indices and the Abbe numbers, respectively, of the respective lenses.

[Embodiment 1]
focal length f = 100   aperture ratio 1:2.8   angle of view 2ω = 24°

| | | | |
|---|---|---|---|
| r1 = 41.0 | d1 = 5.3 | n1 = 1.61272 | ν1 = 58.6 |
| r2 = 298.19 | d2 = 0.75 | | |
| r3 = 29.92 | d3 = 9.8 | n2 = 1.62041 | ν2 = 60.3 |
| r4 = 71.72 | d4 = 1.8 | | |
| r5 = 149.221 | d5 = 4.5 | n3 = 1.71736 | ν3 = 29.5 |
| r6 = 19.836 | d6 = 29.4 | | |
| r7 = 71.0 | d7 = 2.0 | n4 = 1.74077 | ν4 = 27.7 |
| r8 = 227.07 | | | |

[Embodiment 2]
focal length f = 100   aperture ratio 1:2.8   angle of view 2ω = 24°

| | | | |
|---|---|---|---|
| r1 = 41.0 | d1 = 5.0 | n1 = 1.61272 | ν1 = 58.6 |
| r2 = 298.19 | d2 = 0.95 | | |
| r3 = 29.692 | d3 = 9.5 | n2 = 1.61272 | ν2 = 58.6 |
| r4 = 70.0 | d4 = 2.1 | | |
| r5 = 147.466 | d5 = 4.8 | n3 = 1.72825 | ν3 = 28.3 |
| r6 = 20.0 | d6 = 27.8 | | |
| r7 = 65.73 | d7 = 2.5 | n4 = 1.74077 | ν4 = 27.7 |
| r8 = 181.204 | | | |

[Embodiment 3]
focal length f = 100   aperture ratio 1:2.8   angle of view 2ω = 18.1°

| | | | |
|---|---|---|---|
| r1 = 42.593 | d1 = 5.0 | n1 = 1.62041 | ν1 = 58.6 |
| r2 = 374.909 | d2 = 0.963 | | |
| r3 = 30.0 | d3 = 9.778 | n2 = 1.62041 | ν2 = 58.6 |
| r4 = 72.507 | d4 = 1.778 | | |
| r5 = 149.507 | d5 = 5.556 | n3 = 1.71736 | ν3 = 29.5 |
| r6 = 19.644 | d6 = 31.111 | | |
| r7 = 70.963 | d7 = 1.926 | n4 = 1.7847 | ν4 = 26.1 |
| r8 = 187.227 | | | |

Figures 2A, 2B, 2C:
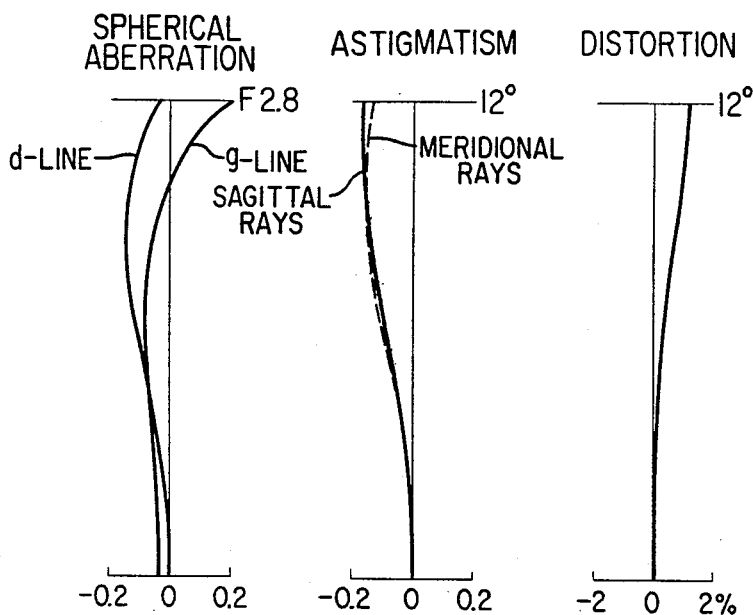

The aberrations in the foregoing embodiments are shown in FIGS. 2, 3 and 4, respectively. From these Figures, it is seen that in any of the embodiments, the particularly, in spite of a simple construction having no joined surface, the chromatic aberration of spherical aberration for short wavelength light (g-line) is well corrected.

I claim:

1. A compact telephoto lens having an angle of view of 18° to 24°, an aperture ratio of 1:2.8 and a telephoto ratio of 0.92 to 0.94, and consisting essentially of, in succession from the object side, a first lens which is a single positive lens having its surface of sharper curvature facing the object side, a second lens which is a positive meniscus lens having its convex surface facing the object side, a third lens which is a single negative lens having its surface of sharper curvature facing the image side, a stop, and a fourth lens which is a single positive lens having its surface of sharper curvature facing the object side, said telephoto lens satisfying the following conditions:

(I) $\begin{cases} 0.35 < f_{12} < 0.4f \\ 0.2f < d_1 + d_2 + d_3 + d_4 + d_5 < 0.25f \\ 0.19f < r_6 < 0.21f \end{cases}$ (II) $\begin{cases} 1.35f < f_{123} < 1.46f \\ 0.27f < d_6 < 0.32f \end{cases}$ (III) $\begin{cases} n_1, n_2 > 1.6, n_3, n_4 > 1.7 \\ \gamma_1, \gamma_2 > 50, \gamma_3, \gamma_4 < 30 \end{cases}$ where $r_1$–$r_8$ represent the radii of curvature, $d_1$–$d_7$ represent the center thickness and air spaces of the respective lenses, $n_1$–$n_4$ represent the refractive indices of the respective lenses, $\gamma_1$–$\gamma_4$ represent the Abbe numbers of the respective lenses, $f_{1-4}$ represent of the focal lengths of the respective lenses, f represents the total focal length of the entire system, $f_{123}$ represents the total focal length of the first to third lenses and $f_{12}$ represents the total focal length of the first and second lenses.

2. A compact telephoto lens according to claim 1, wherein numerical data are as follows:

focal length f = 100   aperture ratio 1:2.8   angle of view 2ω = 24°

| | | | |
|---|---|---|---|
| r1 = 41.0 | d1 = 5.3 | n1 = 1.61272 | ν1 = 58.6 |
| r2 = 298.19 | d2 = 0.75 | | |
| r3 = 29.92 | d3 = 9.8 | n2 = 1.62041 | ν2 = 60.3 |
| r4 = 71.72 | d4 = 1.8 | | |
| r5 = 149.221 | d5 = 4.5 | n3 = 1.71736 | ν3 = 29.5 |
| r6 = 19.836 | d6 = 29.4 | | |
| r7 = 71.0 | d7 = 2.0 | n4 = 1.74077 | ν4 = 27.7 |
| r8 = 227.07 | | | |

3. A compact telephoto lens according to claim 1, wherein numerical data are as follows:

focal length f = 100   aperture ratio 1:2.8   angle of view 2ω = 24°

| | | | |
|---|---|---|---|
| r1 = 41.0 | d1 = 5.0 | n1 = 1.61272 | ν1 = 58.6 |
| r2 = 298.19 | d2 = 0.95 | | |
| r3 = 29.692 | d3 = 9.5 | n2 = 1.61272 | ν2 = 58.6 |
| r4 = 70.0 | d4 = 2.1 | | |
| r5 = 147.466 | d5 = 4.8 | n3 = 1.72825 | ν3 = 28.3 |
| r6 = 20.0 | d6 = 27.8 | | |
| r7 = 65.73 | d7 = 2.5 | n4 = 1.74077 | ν4 = 27.7 |
| r8 = 181.204 | | | |

4. A compact telephoto lens according to claim 1, wherein numerical data are as follows:

focal length f = 100   aperture ratio 1:2.8   angle of view 2ω = 18.1°

| | | | |
|---|---|---|---|
| r1 = 42.593 | d1 = 5.0 | n1 = 1.62041 | ν1 = 58.6 |
| r2 = 374.909 | d2 = 0.963 | | |
| r3 = 30.0 | d3 = 9.778 | n2 = 1.62041 | ν2 = 58.6 |
| r4 = 72.507 | d4 = 1.778 | | |
| r5 = 149.507 | d5 = 5.556 | n3 = 1.71736 | ν3 = 29.5 |
| r6 = 19.644 | d6 = 31.111 | | |
| r7 = 70.963 | d7 = 1.926 | n4 = 1.7847 | ν4 = 26.1 |
| r8 = 187.227 | | | |

* * * * *

UNITED STATES PATENT AND TRADEMARK OFFICE
CERTIFICATE OF CORRECTION

PATENT NO. : 4,303,314
DATED : December 1, 1981
INVENTOR(S) : SEI MATSUI

It is certified that error appears in the above-identified patent and that said Letters Patent is hereby corrected as shown below:

Column 1, line 54, "0.35" should be --0.35f--.

Column 3, line 41, "the" (second occurrence) should be --and--.

Column 4, line 1, "0.35" should be --0.35f--;

line 17, "$f_1 - 4$" should be --$f_1 - f_4$--.

Signed and Sealed this

Thirty-first Day of May 1983

[SEAL]

Attest:

DONALD J. QUIGG

Attesting Officer     Acting Commissioner of Patents and Trademarks